United States Patent [19]

Sigel-Gfeller

[11] 4,112,850
[45] Sep. 12, 1978

[54] CONVEYOR APPARATUS FOR THE INTERIOR OF PIPELINES

[76] Inventor: Alwin Sigel-Gfeller, Nussberg, 8418 Schlatt, Switzerland

[21] Appl. No.: 769,452

[22] Filed: Feb. 17, 1977

[30] Foreign Application Priority Data

Feb. 24, 1976 [CH] Switzerland .......................... 2258/76

[51] Int. Cl.² ............................................. F17D 5/00
[52] U.S. Cl. ............................. 104/138 G; 15/104.05; 73/40.5 R; 118/DIG. 10; 250/358 P
[58] Field of Search .................. 33/1 H, 178 F; 73/40, 73/40.5 R, 40.5 A; 134/166 C, 167 C, 168 C, 169 C; 118/105, 254, 306, 408, DIG. 10; 254/134.5; 15/104.05, 104.3 R; 305/22, 31; 250/358 P; 104/138 C, 138 R

[56] References Cited

U.S. PATENT DOCUMENTS

| | | | |
|---|---|---|---|
| 1,276,035 | 8/1918 | Crane | 305/31 |
| 1,836,446 | 12/1931 | Christie | 305/22 |
| 3,064,127 | 11/1962 | Green et al. | 73/40.5 R |
| 3,125,464 | 3/1964 | Harmes | 118/408 |
| 3,895,604 | 7/1975 | Ryan | 118/306 |

FOREIGN PATENT DOCUMENTS

| | | | |
|---|---|---|---|
| 2,607,412 | 9/1976 | Fed. Rep. of Germany | 73/40.5 R |
| 207,399 | 12/1967 | U.S.S.R. | 33/178 |

*Primary Examiner*—Albert J. Makay
*Assistant Examiner*—Carl Rowold
*Attorney, Agent, or Firm*—J. Harold Nissen

[57] ABSTRACT

Conveyor apparatus for checking the interior of a pipeline. The apparatus includes two chassis sections, one of which is adapted to drive the apparatus, and the other of which is driven. A pair of endless belts connects both of the chassis sections and are maintained in contact with the interior wall of the pipeline. The spacing between the portions of the belts in contact with the wall may be adjusted to the width of the pipeline. A swivel plate is provided to adjust the spacing between rollers which urge the belts into contact with the wall. The swivel plates and chassis sections are spring-biased to adjust the slight variations in pipeline diameter and are adjustable for different pipeline diameters.

13 Claims, 6 Drawing Figures

Fig. 6

CONVEYOR APPARATUS FOR THE INTERIOR OF PIPELINES

BACKGROUND OF THE INVENTION

The invention is concerned with apparatus for moving measuring and testing devices or apparatus through a pipeline having limited access thereto.

Specifically, the invention is concerned with the testing and checking of pipelines which have a diameter in the range of 7 to 500 millimeters. The devices are generally used to inspect a pipeline by means of a television-type of camera which is carried, pushed or pulled through the pipeline so that the interior of the pipeline may be viewed, particularly for those interior areas of the pipeline which are not viewable or accessible by other means.

In some instances, drawings indicating the characteristics of the interior of a pipeline are not available so that it becomes difficult to ascertain the interior characteristics. For example, it may be necessary to locate a lead-off from a pipeline and distinguish it from a leak. For various reasons, it has now become necessary to obtain a pictorial view of the interior characteristics of a pipeline.

Additionally, it is important that the characteristics of the flow pattern in a pipeline be checked, particularly in those areas where the flow is not readily known from the outside. In this way, leakage and other types of losses in the fluid flowing in the pipeline can be detected. It is also possible to detect for gas leakage into or out of the pipeline.

DESCRIPTION OF THE PRIOR ART

Prior art apparatus generally rely upon the weight of the apparatus itself to maintain stability. Some of the problems with the prior art apparatus is that it readily tips over and results in the clogging or blockage of the pipeline. As a consequence of the light weight required of the apparatus, tip-over resulted because it is generally undesirable to increase the weight of the apparatus beyond a certain amount as propulsion costs would be increased and possibly become a major consideration. Hence, a trade-off must be made between the weight of the apparatus and its stability. For a particular weight, a certain amount of adhesion between the walls of the pipeline and the apparatus will take place. Beyond a certain amount, the cost of propulsion would be increased and the problems connected therewith would become excessive.

In some situations, when the interior of the pipeline is slippery or dirty, it becomes difficult to propell the light weight apparatus forward. In other situations, the interior of the pipeline may be inclined, and this also results in difficulties. The prior art apparatus have also been provided with one side drive, and this also can result in tip-over or a reversal of the apparatus when inside the pipeline. Should this occur, it then can become necessary to dig up the pipeline to remove the disabled apparatus.

With some prior art apparatus, a large amount of digging is required because the place of disablement or getting stuck of the apparatus is not readily ascertainable.

Other prior art apparatus may have numerous parts and therefore while suitable for the purpose are too costly.

An earlier apparatus known to the applicant which avoids some of the difficulties set forth heretofore is disclosed in Swiss Pat. No. 582,328. In fact, the applicant is the inventor of the subject matter of the aforementioned Swiss patent.

The apparatus of the Swiss patent while overcoming many of the difficulties of the prior art has some problems of its own including a large number of costly parts, and, in some instances difficulties in maneuverability. Nevertheless, the apparatus of the Swiss patent is less likely to tip over than the other prior art apparatus.

Specifically, the apparatus of the Swiss patent includes a single elongated chassis composed of two longitudinally extending elongated elements symetrically positioned axially of the single chassis at the front portion thereof. The rear of the chassis includes a pair of cross-members to support an electrical propulsion motor and is provided with suitable electrical connections to energize the motor from a source external of the pipeline. A pair of endless parallel conveyor belts positioned on opposite sides of the axis of the chassis are provided which lie in the same plane in order to move the apparatus along the interior of the pipeline. Each of the longitudinally extending elements includes a plurality of swivel rollers which can rotate about their own axes and revolve about another axis so as to be movable in a direction transverse to the axis of the chassis. The longitudinal elements move in a direction axially of the chassis and parallel to each other.

One of the cross-members carries a pair of movable or drive rollers which are appropriately geared to the drive motor. One drive roller and one set of swivel rollers carried by one of the longitudinal elements are coupled together by an endless conveyor belt. The swivel rollers which are movable in a direction transverse to the axis of the chassis insures that the endless conveyor belts are in contact with the inner wall of the pipeline. In order to take care of different interior diameter pipelines, a toothed segment is provided for each swivel roller to move it in a direction towards and away from the longitudinal axis of the chassis so as to decrease or increase the diametrical extent of the spacing between the swivel rollers.

As the endless belts have a predetermined diameter, and the belts are carried by the movable roller and swivel wheels, provision is made to move the longitudinal elements in a direction towards the movable roller and the rear of the chassis as the oppositely disposed swivel wheels move away from each other, and move the longitudinal elements in a direction away from the movable roller towards the front of the chassis as the oppositely disposed swivel wheels move towards each other, thereby decreasing the diametrical spacing therebetween.

Connection means to the swivel wheels for a spring-biased feeler element is also provided which has two active positions. One of the active positions is in a bent-over condition in substantial alignment with the outermost periphery of the endless belts. In this position, the feeler elements are in their inactive position. However, should a discontinuity in the pipeline occur or a lead-off from the pipeline be encountered, the endless belt by virtue of its longitudinal extent will pass across the discontinuity or lead-off. However, the spring-biased feeler element is then sprung into its second active position into the discontinuity of the pipeline or the lead-off. Electrical contacts are provided in the feeler element which are activated to indicate the movement of the feeler element into its second active position. The activation of the electrical contacts is communicated to a station above ground at the entrance to the pipeline. For this purpose, appropriate cables may be run with the cables to supply electrical power to the electric propulsion motor.

The apparatus also includes provision to carry a measuring tape to indicate distance into the pipeline. Provision is also made whereby the single chassis can carry illumination means and push a television camera into the pipeline so that external viewing of the interior thereof is possible. As a result of the long longitudinal extent, the chassis may become jammed in the pipeline or be difficult to maneuver. Moreover, the large number of moving parts increases the cost of the apparatus and the repair time, should this be necessary. In addition, a long longitudinal extent of the endless conveyor belt adds to the difficulty to move the apparatus through sections with sharp or abrupt curves. On the specific embodiment, three swivel rollers are provided which requires a large straight portion of the endless belt to be in contact with the inner wall of the pipeline.

Therefore, while the apparatus of the Swiss Patent is a considerable improvement over the other prior art apparatus, it is also limited to a degree to the different diameter pipelines.

It is therefore an object of the invention to overcome the aforesaid difficulties by providing an apparatus which has a minimum number of parts to reduce the cost thereof.

Another object of the invention is to provide an apparatus which is easily maneuverable in the pipeline.

A further object of the invention is to provide an apparatus which can readily adjust to abrupt changes in direction of bend of the pipeline while the pipeline retains the same diameter.

Moreover, it is a purpose of the invention to provide for a conveyor apparatus which can be equally well used for small diameter pipelines as well as large diameter pipelines.

BRIEF DESCRIPTION OF THE INVENTION

In order to overcome the aforesaid difficulties, the present invention provides for a pair of chassis sections which has a short longitudinal extent and is easily maneuverable. Each chassis section includes a single wheel on each chassis section to place the endless conveyor belts into contact with the inside walls of the pipeline. A pair of endless conveyor belts are provided which lie in planes parallel to each other. One of the endless belts passes over a swivel wheel or roller on each of the chassis parts and are urged into contact with the interior wall of the pipeline. The two chassis sections are connected with each other by means of a telescopic arrangement and are spring-urged away from each other so that the belts are always maintained taut depending upon the diametral spacing between the rollers from the longitudinal axes of the chassis sections. As the diametral extent of the rollers from the axes of the chassis sections is increased, the chassis sections are moved closer to each other, and as the diametral extent is decreased, the chassis sections are urged away from each other. Each chassis section also includes a spring loaded swivel plate which carries the diametrally movable roller and a setting plate to set the lateral extent of the roller. Depending on the diameter of the pipeline, the setting plate is adjusted for a particular diameter pipeline. In order to take care of slight variations in the diameter of the pipeline, the swivel plate is spring-pressure loaded to engage the roller with the belt and to take care of slight variations in the pipelines diameter. This assures that the endless conveyor belt is always in contact with the walls of the pipeline. Each chassis section carries only two oppositely disposed rollers. Therefore, only two rollers are used to urge the belt into engagement with the wall on each side of the apparatus.

Turning of the apparatus inside the pipeline is simplified because only one roller to cause the belt to engage the sidewall is provided for each chassis section.

The conveyor apparatus is provided with turn-around rollers which can be driven to drive the swivel-mounted rollers. The endless conveyor belt straps pass over the swivel-mounted rollers and the drive rollers so that the belt straps are always maintained in contact with the sidewalls of the interior of the pipeline in order to propel the chassis sections within the pipeline.

The chassis sections and swivel plates are spring-biased to adjust for minor variations in pipe diameter and are adjustable for pipelines of different diameters. As only a single roller is attached to each swivel plate, the spring bias is direct-acting on the single roller to assure appropriate movement of the belt against the inner wall of the pipeline.

Feelers are provided which include an internal combination spring mechanism to provide an indication when there is a large discontinuity in the pipeline. For this purpose, a feeler ball is provided which is in a normally bent-over condition, but is spring biased to be moved into an upright position to close electrical contacts and provide an indication that the conveyor apparatus is passing an internal discontinuity, such as a break in the pipeline or a tap-off or a lead-off.

Other objects, advantages and the nature of the invention will be fully understood and become apparent from the following description of the preferred embodiments of the invention, shown, by way of example, in the accompanying drawings:

DESCRIPTION OF THE PREFERRED EMBODIMENTS

Figure 1:
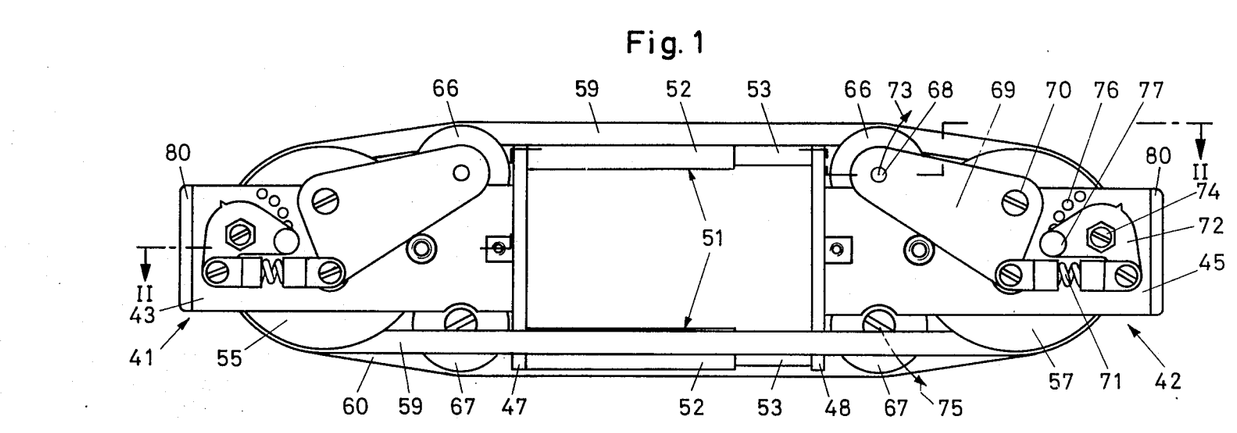
FIG. 1 is a side view of one embodiment of the conveyor apparatus according to the invention.
Figure 2:
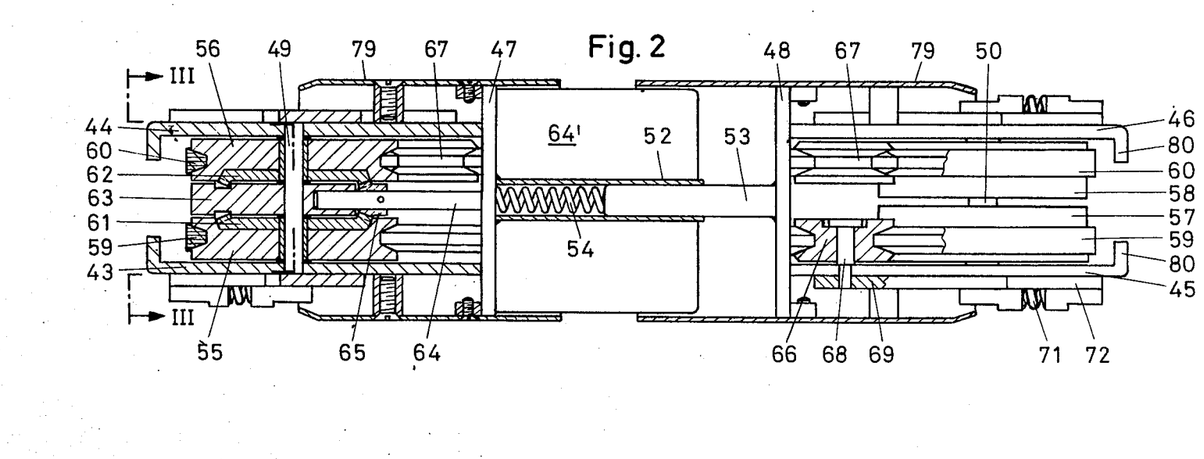
FIG. 2 is a longitudinal sectional view taken along line II — II of FIG. 1.
Figures 3, 4:
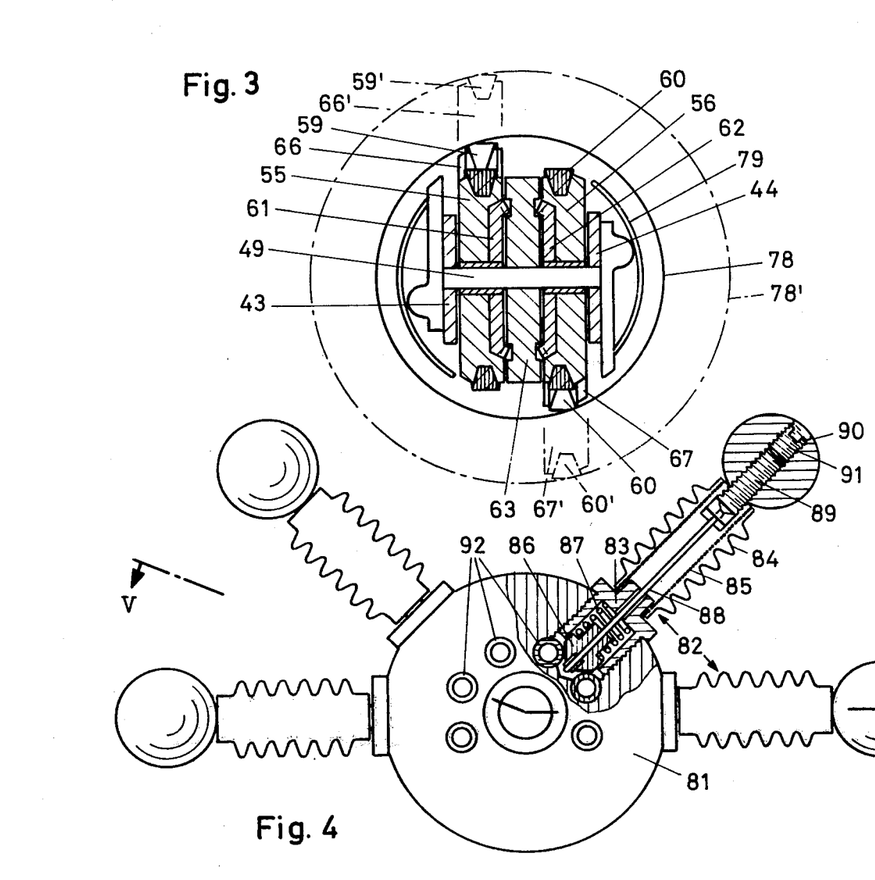
FIG. 3 is a vertical sectional view taken along lines III — 0 III of FIG. 2. Two pipelines are also shown, one of small diameter in full outline, and a larger diameter pipeline in dotted outline.
FIG. 4 is a front view of a mountable and demountable feeler head for the apparatus as shown in FIG. 1.

Referring more particularly to FIGS. 1 to 3, which show one preferred form of the invention, the conveyor apparatus includes two corresponding and substantially identical chassis parts or sections 41 and 42. Chassis section 41 and 42, each respectively include longitudinal plates 43, 44 and 45, 46, shafts or bolts 49 and 50 to connect longitudinal plates 43, 44 to each other and longitudinal plates 45, 46 to each other, and cross plates 47 and 48.

Chassis parts or sections 41 and 42 are telescopically connected to each other by means of a pair of telescopic apparatus 51. Each telescopic apparatus 51 includes an outer member or casing 52, connected with cross plate 47 and an inner member 53 connected with cross plate 48. Each casing 52 includes a pressure or compression spring 54 which has one end bearing against the base of outer member 52 and another end bearing on one end of inner member 53 which is received within outer member 52. The other end of inner member 53 is connected with cross plate 48. The purpose of compression or pressure spring 54 is to push or press chassis parts 41, 42 apart from each other.

Each shaft 49 and 50, respectively, carries belt guide rollers or turn around rollers 55, 56 and 57, 58. Each of the rollers are provided with a grooved portion to receive a wedge-shaped continuous belt strap. Belt strap 59 connects chassis parts 41, 42 and is carried by guide rollers 55 and 57, and belt strap 60 also connects chassis parts 41, 42 and is carried by guide rollers 56 and 58. Rollers 55 to 58 have casings formed of plastic or synthetic products and are freely movable on their shafts or bolts. An electric motor 64' carried by chassis part 41 is geared with rollers 55, 56 to drive them and in turn drive belt straps 59, 60. Rollers 57 and 58 are freely movable and driven by the belt connection with rollers 55 and 56. Each roller 55, 56 on the inside thereof carries a bevel wheel or gear 61, 62, respectively, fixedly connected therewith. Mounted on shaft 49 between each roller 55, 56 and between bevel gears 61, 62 is a forward disk 63. Forward disk 63 includes a ringlike groove or recess on each face facing bevel gears 61, 62 to receive the teeth thereof.

Cone-shaped pinion 65 is connected with shaft 64 and meshed with bevel gears 61, 62. Shaft 64 is driven by the electric motor schematically represented by 64'. The electric motor which is carried on chassis part 41 is held by cross plate 47. The electric motor 64' is a DC motor with built-in gearing so that by changing the voltage in a conventional manner, the direction and speed of rotation of the motor can be controlled and thereby control the direction and speed of rotation of rollers 55 and 56. The motor is preferably enclosed so as to protect it against outside influences such as water and dirt.

As viewed in FIG. 1, belt strap 59 passes over roller 55 and two upper rollers 66, and belt strap 60 passes over roller 56 and two lower rollers 67. Each chassis section 41, 42 includes a single swivel roller 66, 67. The rollers 66, 67 are provided to insure that the belt straps 59, 60 press against the inside wall of the pipeline at diametrically opposite points thereof. Telescopic arrangements 51 urge chassis sections 41, 42 apart from each other to insure that belt straps 59 and 60 are held taut onto the rollers.

In order to insure that rollers 66 and 67 press belt straps 59, 60 against the inside wall of the pipeline, a three cornered or three-lobed swing or swivel plate is provided, such as swing plate 69 which is connected with longitudinal plate 45 by means of screw 70 at one corner. Roller 66 is connected to a second corner by means of axle 68, and the third corner is connected with one end of a compression spring mechanism 71, the other end of spring mechanism 71 being connected with a setting plate 72. The force of compression spring mechanism 71 is such that it urges three-lobed swing plate 69 to rotate in the direction of arrow 73.

Setting plate 72 is connected with longitudinal plate 45 by means of set screw 74 which can be loosened to adjust the position of spring mechanism 71. Adjustment of spring mechanism 71 permits the adjustment of the initial position or starting position of wheel 66 so that it can be moved outwardly of chassis section 42 or inwardly thereof.

In a similar manner, each of the other rollers 66 and 67 are provided with the same type of adjustments. Arrow 75 shows the direction of movement of wheel 67 connected with chassis section 42 as being in a downward direction in FIG. 1. Each of the longitudinal plates are provided with openings or depressions 76 adapted to receive a setting pin 77 so that all rollers 66, 67 can be set in correspondence with each other in accordance with the diameter of the pipeline.

FIG. 3 shows a pipeline 78 of a smaller diameter in full outline and a pipeline 78' in dotted outline of a larger diameter and the manner in which wheels 66, 67 are adjustable together with belt straps 59, 60.

For the small diameter pipeline 78 rollers 66, 67 and belts 59, 60 are shown in full outline in contact with the inside diametrically opposite walls. For the large diameter pipeline 78', the wheels are in the position of rollers 66' and 67' and the belts are in the position of belts 59' and 60'. Setting plate 72 is used to adjust the position of the rollers 66, 67 and belts 59, 60 to move them from the full outline position to the dotted outline position. Minor variations in wall diameter or discontinuities in the interior wall is detected and taken care of by the movement of three-lobed plate 69 in response to movement outwardly by pressure spring 71 or inwardly against the force of pressure spring 71. When rollers 66, 67 are moved inwardly for a smaller diameter pipeline, spring 54 in telescopic arrangement 51 moves the chassis sections apart from each other and when rollers 66, 67 are moved outwardly for a larger diameter pipeline the chassis sections 41, 42 move closer to each other against the force of compression spring 54 so as to avoid any looseness in belts 59, 60 which may result in a scraping or grinding of the belts between the walls and the rollers.

Lateral tin covers 79 are screwed onto longitudinal plates 43 to 46 and cross-plates 47, 48 by means of screws (undesignated) in order to protect swivel plates 69 and rollers 66, 67 against damage during forward movement in the pipeline and provide for smooth side areas of the apparatus to facilitate movement through the pipeline. In all respects, the apparatus does not have any open or sensitive parts. Therefore, it can be easily washed down with water to remove any dirt. Moreover, because of the compact arrangement of the parts and the manner in which they are positioned with respect to each other, the conveyor apparatus can be inserted into small diameter pipelines with diameters as small as 70mm.

Cables are carried along in the pipeline by the apparatus of FIGS. 1 and 2, and motor 64' is fed and steered by chassis section 41. In addition, a measuring apparatus may also be carried by or may be attached to chassis section 42. Measuring and detecting apparatus can also be carried through the pipeline by attaching them to cornered or inwardly directed ends 80 which are an extension of longitudinal plates 43, 44, 45 and 46. For example, a measuring tape can be attached to the two sides of the chassis sections at the inwardly turned ends 80.

Figure 5:
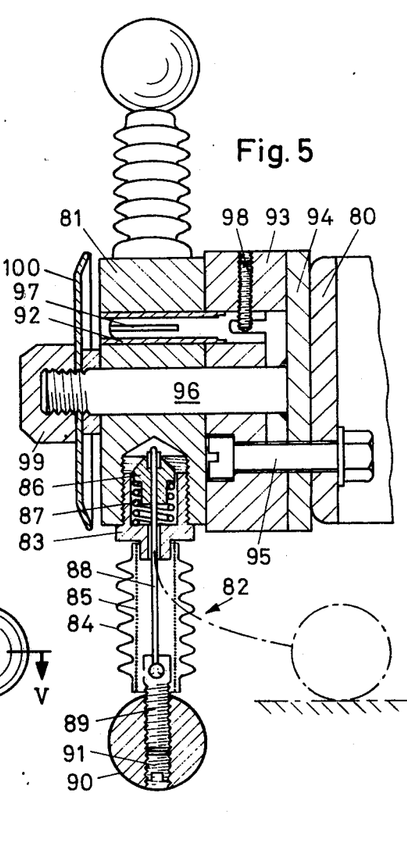
FIG. 5 is a sectional view taken along line V — V of FIG. 4.

Referring more particularly to FIGS. 4 and 5, feeler carrier or sensor 81 is shown which is attachable to the inwardly turned ends 80. Feeler carrier 81 consists of insulating material on its outer surface and includes a number of feelers 82 which are flexible and spring biased to detect any discontinuity in the pipeline or any opening into a tap-off or lead off, such as an auxiliary pipeline, away from the main pipeline.

Each feeler 82 includes a pliable and flexible bellows-type of outer sleeve 84 and an inner tightly wound tension spring 85 connected with feeler foot 83. The feeler foot has an outer screw configuration so that it can be attached to feeler carrier 81 by being screwed thereinto.

Each feeler foot 83 includes contact head 86, having a broad base and a narrowed shaft portion, and a flexible compression coil spring 87 surrounding the narrowed shaft. Compression spring 87 has one end bearing against the broad base and its other end held against the underside of a flange portion of feeler foot 83.

Each feeler 82 includes at the end opposite to feeler foot 83, feeler ball 90 which is attached to core bolt 89 in the form of a worm-like screw 91. Funicular section or cable 88 connects contact head 86 with core bolt 89 and is generally positioned centrally of the axis of feeler 82.

Feeler carrier 81 includes a plurality of cylindrical boxes or canisters 92 equally spaced from each other with two being provided for each feeler 82, one of which is common between two adjacent pairs of feelers. Two pairs of feelers 82 are provided with each pair being disposed on opposite sides of a central axis. Three canisters 92 are provided on one side of the central axis and three canisters 92 are provided on the other side of the central axis to cooperate with the one pair of feelers on each side of the central axis. Contact head 86 in its extended condition makes contact with one pair of canisters 92, and for each pair of feelers 82, the contact heads 86 are adapted to make contact with one of the canisters 92 which is in common with both of them so that when both contact heads of one pair of adjacent feelers is in contact with the canisters 92, all three are in electrical contact with each other. Coil spring 87 urges contact 86 into contact with canisters 92.

Feeler ball 90 when in a normal pipeline assumes the position shown in the dot-dashed or broken line in FIG. 5 and permits spring 87 to urge contact head 86 which is cone-shaped into contact with canisters 92, but when feeler ball assumes the position shown in full outline in FIG. 5 tension spring 85 is effective to overcome the force of compression spring 87 and move contact head 86 out of contact with canisters 92 and thereby detect a broken pipeline or an auxiliary lead off pipeline.

The connection of feeler carriers 81 to the chassis sections 41, 42 is best seen in FIG. 5. Feeler carriers 81 are connected with the cornered ends or turned-in ends 80. The connection to ends 80 includes plug 93 of insulating material and metal disk 94 which are connected by nut-bolt combination 95 to ends 80. Disk 94 carries a central shaft and coil bolt 96 to connect cylindrical feeler head 81 to ends 80. Bolt 96 is provided with a threaded end to receive a mother 99 or female threaded element to hold carriers 81 onto end 80. Plug 93 carries plug pins 97 which fit into canisters or cylindrical boxes 92 to make electrical contact with contact head 86. An electrical connection (not shown) can be connected with plug 97 by means of worm screw 98. To protect the feeler carrier 81 against damage in the pipeline, safety cap 100 is provided which is carried on bolt 96.

Numerous devices external of the chassis sections and outside the pipeline can be provided to provide visual and/or audio indications when two adjoining cylindrical boxes are connected by means of the contact head 86. For this purpose, electrical cables which extend external of the pipeline and are connected with screw 98 can be provided. Connections such as those shown and disclosed in my Swiss Pat. No. 582,328 can also be provided.

In a normal pipeline, feelers 82 are bent as shown in dot-dashed outline. When a discontinuity, break or lead off pipeline is encountered in the main pipeline, feelers 82 assume their full outline position as shown in FIG. 5. When feeler ball 90 assumes the full outline position, contact head 86 is drawn outwardly and away from two coordinated or cooperating cylindrical boxes 92 so as to break the electrical circuit between them. As the chassis sections 41, 42 are moved in the pipeline past a break, a discontinuity, or a lead off auxiliary pipeline, the feeler ball resumes its normal position shown in the dot-dashed outline and permits coil spring 87 to move contact head 86 again into contact with its coordinated adjacent cylindrical boxes 92 to restore the continuity of the electrical circuit therebetween.

Therefore, a variety of possible measuring and testing devices can be used to cooperate with remote signals to indicate the condition of the interior of the pipeline.

Figure 6:
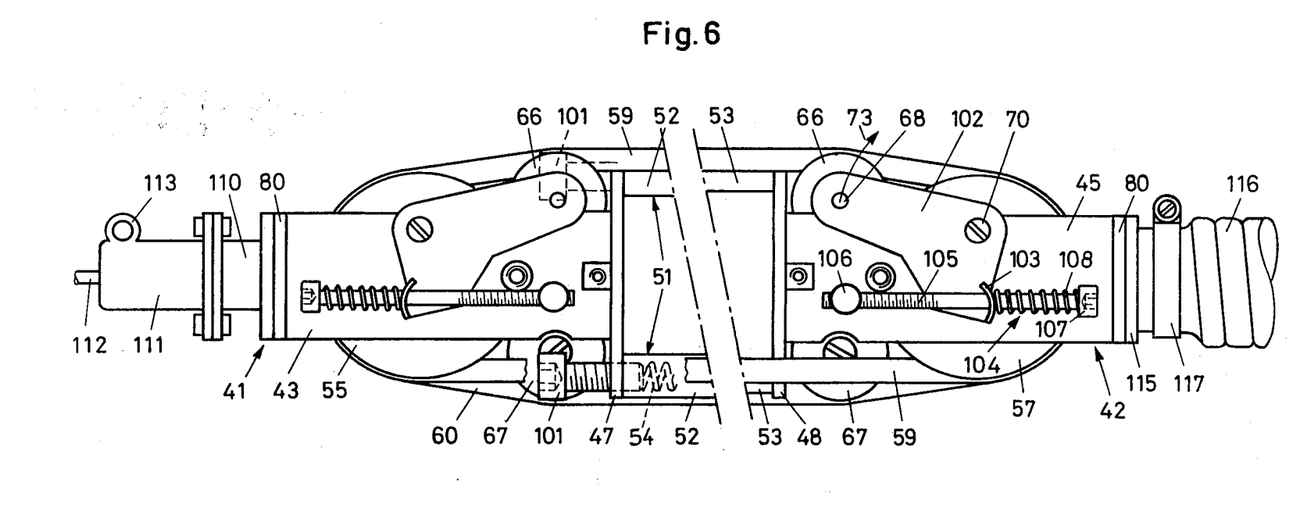
FIG. 6 is a side view of another embodiment of the invention which is a modification of the apparatus of FIGS. 1-3.

Referring now more particularly to FIG. 6 of the accompanying drawing, a modification of the apparatus of FIG. 1 is shown which includes alternative constructional features particularly suited to carry a cable along with the apparatus as it passes through the pipeline as well as a T.V. camera. Corresponding parts in the FIGS. 1 and 6 embodiments will be designated by the same reference numberals.

The apparatus includes chassis sections 41 and 42 which are connected together by means of telescopic arrangements 51. Two telescopic arrangements 51 are provided, and each includes an inner telescopic member 53 slidably movable within casing 52. Each telescopic arrangement 51 includes a pressure spring 54 adapted to urge inner member 53 out of casing 52. Outer casing member 52 is connected with cross-plate 47 and inner member 53 is connected with cross plate 48. In this embodiment, spring 54 passes through cross plate 47 rather than bearing on cross plate 47 as in the FIGS. 1-2 embodiment. For this purpose, a screw bolt 101 is provided which is screwed into cross plate 47 and is held thereby so as to have its shank portion adjustably movable within outer casing 52. One end of force-exerting spring 54 bears against the base of the shank portion of screw bolt 101, and the other end of pressure spring 54 bears against cross plate 48. Springs 54 are effective to urge chassis sections 41 and 42 away from each other. The amount of force which springs 54 exert on chassis sections 41 and 42 is controlled by the positioning of screw bolts 101. This particular embodiment is particularly useful in the larger diameter pipelines where the chassis sections 41–42 should be closer together in order to obtain a wider diametrical spacing between swivel rollers or roller wheels 66 and 67.

The guide rollers and swivel rollers each include an undercut wedge-shape portion. The endless belts are wedge-shaped and adapted to be received in the wedge-shaped portion of the rollers and cooperate therewith to assure proper contact and alignment with each other.

In the FIG. 6 embodiment, belt straps 59 and 60 are also pressed outwardly by roller wheels 66 and 67, but a somewhat different mechanism is provided for this purpose. For this purpose, the mechanism includes a three-lobed swivel or swing plate 102 whose position is adjustable to move swivel rollers 66 and 67 outwardly so that rollers 66 and 67 can engage the inside walls of the pipeline.

In a manner similar to the FIGS. 1–2 embodiment, upper roller 66 is connected to one corner of three-lobed swivel plate 102 by means of bolt 68 and is movable outwardly in the direction of arrow 73. In a similar manner, the second corner of plate 102 is connected to chassis section 42 by means of screw 70. The third corner of the swivel plate 102 includes a curved ramp 103. Curved ramp 103 is provided with an aperture adapted to receive a swing or swivel plate setting means in the form of a screw bolt 104 which passes therethrough. Screw bolt 104 has its shank portion 105 partially threaded and connected with a plug 106 which is attached to longitudinal plate 45. Screw bolt 104 carries a pressure or force-exerting spring 108 which is coiled or fits around the shank portion 105 of screw bolt setting means 104 and is positioned between head 107 of screw bolt 104 and ramp 103. Swing plate 102 is always connected with setting means 104 at apertured ramp 103 and is movable in response to variation of threaded portion 105 in plug 106. Rotation of head 107 in one direction will cause thread 105 to be moved into the screw receiving portion plug 106 so as to compress spring 108 thereby to exert pressure on ramp 103 and thereby to cause swivel plate 102 to rotate about screw 70 and move roller wheels 66 in the direction of arrow 73. Spring 108 is also effective to take care of slight discontinuities in the pipeline to permit some transverse movement of rollers 66, 67. While only one swivel plate 102 has been fully described, in connection with roller wheel 66 on chassis section 42, it is to be understood that roller wheel 66 on chassis section 41 is also movable by means of the same type of three-lobed swivel plate 102, undesignated on chassis section 41. Lower roller wheels 67 are also connected in the same manner to a swivel plate 102. Diametrically opposed roller wheels 66 and 67 which are positioned on opposite sides of the diametrical axis of chassis sections 41, 42 are movable in the direction transverse to the axis of chassis sections 41, 42 either inwardly or outwardly so that roller wheels 66 and 67 can place belt straps 59 and 60 in contact with the inner surfaces of the pipeline. The adjustable pressure springs 54 which force chassis sections 41 and 42 to move away from each other maintain belt straps 59 and 60 taut or sufficiently stretched so that they are always in contact with their respective roller wheels and drive wheels 55, 56, 57 and 58. As the diameter of the pipeline becomes wider, chassis sections 41, 42 are moved closer together and wheels 66 and 67 are moved outwardly diametrically opposite to each other and in a direction transverse to the axis of chassis sections 41, 42.

Chassis section 41 is the rear end of the apparatus and is the drive section. Chassis section 42 is the front end and the driven section. At the trailing end of chassis section 41, plug socket 110 is carried by curved or turned-in ends 80 which form an extension of longitudinal plate 45. Bolted to socket plug 110 is plug 111 which is releasably connected with socket 110 and carries an electrical cable 112 which can be uncoiled as chassis section is moved into the pipeline. Plug 111 also includes a ring or ear piece 113 to which a tape measure can be connected in order to measure the distance traversed within the pipeline so as to be able to measure the distance the apparatus has moved inside the pipeline from the entrance thereto.

At the front end of the apparatus or leading end of chassis section 42, a tube or pipe 115 is connected with the curved or turned-in ends 80 of longitudinal plate 45. A flexible, but comparatively rigid pipe or conduit is connected to tube 115 by means of a bride or clamp 117. While it is not shown, it is to be understood that a sled or conveyor to carry a T.V. camera can be attached to flexible pipe 116 and pushed or moved along with the apparatus. Depending upon the direction of movement, the T.V. camera is either pulled or pushed in the pipeline. Preferably, the apparatus in used to push the T.V. camera together with an illumination mechanism in the pipeline. As the apparatus is moved into the pipeline, cable 112 can also be unwound from a cable carrying reel external of the pipeline. The electrical wires for the T.V. camera and illumination device for the T.V. camera are connected by appropriate electrical wiring and guided through flexible pipe 116 and through plug socket 110 and carried along with or guided by cable 112 from the entrace of the pipeline. In this respect, sleds or vehicles containing a T.V. camera together with illumination therefor for inspection purposes for pipelines are generally known. Instead of using a flexible tubing 116, it is also possible to use other suitable connection mechanisms such as a cross-link type of connecter.

With the apparatus according to the invention, it is possible to provide for the inspection of the interior of pipelines with a simple apparatus having a lesser number of parts. It is also possible to avoid numerous test diggings to ascertain the location of a fault or leak in a pipeline. With the present apparatus, it is possible to ascertain with precision the location of a fault in a pipeline so that digging can be restricted to a very narrow location or area.

Another advantage of the apparatus is that it is possible to detect the location of escaping gas in streets. Such leaks are quite dangerous due to the possibility of an explosion. Moreover, the problems of escaping gases into homes and the costs for such search, location, and detection can be reduced. For this purpose, the apparatus can be provided with a well-known gas detector which may be attached to a cable to join it with the apparatus. The apparatus with a gas detector can be moved through a large sewer pipe or sewage canal for the collection of safety waters. Leaking gases can enter into such a canal. With the apparatus according to the invention, and a gas detector carried therewith, it is possible to locate the area of maximum gas concentration in the canal, and by measuring the distance from the entrance with the measuring tapes, the exact site of the unsafe section of the canal or a leakage gas line can be ascertained. This also avoids unnecessary digging, and it permits the rapid isolation of the area of the gas leak.

While there has been shown what is considered to be the preferred embodiments of the invention, it will be obvious that various changes and modification may be made therein without departing from the scope of the invention.

I claim:

1. Conveyor apparatus for moving test devices through the interior of a pipeline which is inaccessible without digging into the ground comprising:

first and second chassis sections, each said chassis sections having a longitudinal axis and each being symmetrical thereabout and means connecting said chassis sections to each other for movement together and for movement relative to each other in an axial direction parallel to the axis of the pipeline;

each said chassis section including first and second guide rollers and first and second swivel rollers, said guide rollers being substantially equally diametrically spaced from the longitudinal axis and being fixed for rotation to said chassis section, and said swivel rollers being diametrically spaced from the longitudinal axis and being fixed for rotation to said chassis section;

said connection means consisting of a telescoping arrangement of the sections with a pressure spring between opposing axially disposed surfaces of the sections and first and second endless belts disposed around the sections that counteract the action of the pressure spring, said first belt being carried by said first guide rollers, and being in contact with said first swivel rollers, said second belt being carried by said second guide rollers and being in contact with said second swivel rollers;

a swing plate for each said swivel roller coupled to one of said chassis sections, each said swivel roller being coupled to its said respective swing plate, said swing plates being individually adjustable to adjust the spacing between said swivel rollers in a diametrical direction transverse to the longitudinal axis of said chassis section, said swivel rollers being adjustable both in a direction towards the longitudinal axis and away from the longitudinal axis so that the longitudinal axis of said chassis can be centered within the interior of the pipeline substantially coinciding with the pipeline axis; and, spring means connected with said chassis section operative to urge said swivel rollers into contact with the interior wall of the pipeline whereby to take care of minor variations in the diameter of the pipeline.

2. Apparatus as set forth in claim 1, wherein said connecting means includes:

said telescoping arrangement comprising an outer member connected to one of said chassis sections and an inner member connected to the other of said chassis sections, said pressure spring associated with said inner and outer members and positioned within said inner member, said pressure spring having one end bearing against the base of said outer member and another end bearing against the base of said inner member to urge said chassis sections away from each other, said pressure spring cooperating with said swivel rollers to maintain said belts taut and in contact with the interior wall of the pipeline while permitting adjustment and movement between said chassis sections to take care of minor variations of the inner wall diameter.

3. Apparatus as set forth in claim 2, including:

a drive motor carried on one of said chassis sections, gearing coupling said guide rollers on said one of said chassis sections to said drive motor, said last-mentioned guide rollers driving said endless belts, and said swivel rollers and the guide rollers on said other chassis section being driven by said last-mentioned guide rollers.

4. Apparatus as set forth in claim 3, wherein said gearing includes:

a bevel gear coupled with each said guide roller, a single drive pinion coupled with said bevel gears and operative in response to said motor; and, said motor is a reversible motor and is adapted for electrical connection with electrical cables which can be carried along with said one chassis section and extending external of the pipeline for control of said motor to control the direction and speed of movement of said chassis sections.

5. Apparatus as set forth in claim 4, including:

a feeler carrier coupled with said other chassis section; and, said feeler carrier including: a plurality of flexible radially arranged feelers which are adapted to ride on the inside wall in one position thereof and to move into a second position when a discontinuity in the wall is detected, and electrical connection means for each said feeler having an inoperative state in said one position of said flexible feelers and an operative state in said other position of said flexible feelers;

6. Apparatus as set forth in claim 1, including:

setting means connected with each said chassis section for each said swing plate to provide for individual adjustment of said swivel rollers, whereby to provide for adjustment of said belts for different diameter pipelines, and said swing plate being a three-lobed element including a first lobe pivotally connected to said chassis section, a second lobe rotatably carrying its said associated swivel roller, and a third lobe operatively associated with said setting means.

7. Apparatus as set forth in claim 6, wherein:

said setting means includes an adjustable screw bolt connected with said chassis section, a pressure spring carried on said bolt having one end in contact with said third lobe to urge said swivel roller and said bolt carried thereby into contact with the wall of the pipeline, a plug on said chassis section, said screw bolt being adjustably connected with said plug to bear on said third-lobe portion and rotate said swing plate about said second lobe-portion.

8. Apparatus as set forth in claim 6 wherein said setting means includes:

a set plate pivoted to said chassis section for each said swivel roller, cooperative means on said set plate and said chassis section for varying the position of said set plate, and pressure spring means connected between said setting means and said third lobe to rotate said swivel plate in response to movement of said set plate, said pressure spring means including a spring urging said swivel roller and the belt thereon into engagement with the interior wall of the pipeline.

9. Apparatus as set forth in claim 1, including: a feeler carrier coupled with one of said chassis sections; and each said feeler carrier includes a plurality of flexibly arranged feelers which are adapted to ride on the inside wall in one position thereof and to move into a second position when a discontinuity in the wall is detected;

each said feeler including a feeler foot, a feeler ball, and flexible spring-biased bellows arrangement connected between said foot and said ball;

said feeler foot comprising an outer casing having means coupling said foot to said carrier, a movable contact head in said casing, and a pressure spring in said casing bearing on said contact contact head urging said contact head in a direction away from said feeler ball;

said flexible spring biased bellows arrangement including an outer bellows connecting said ball and said foot and an inner spring member urging said ball and feeling foot together;

a cable connecting said contact head with said ball, said cable being positioned within said bellows arrangement to move said contact against the force of said pressure spring in said casing, said last-mentioned pressure spring urging said contact head away from said ball, said ball and said inner spring member being adapted in one position thereof to overcome the force of said last-mentioned pressure spring;

an electrical contact carried by said feeler carrier adapted for electrical contact with said contact head, when said last-mentioned pressure spring urges said ball and feeler foot apart until said ball encounters a discontinuity in the wall of the pipeline, said contact head being moved out of contact with said last-mentioned electrical contacts, when said inner spring member overcomes the force of said last-mentioned pressure spring during movement of said ball along the inner wall of the pipeline; and, electrical connection means for each said feeler having an inoperative state in said one position of said flexible feelers and an operative state in said other position of said flexible feelers.

10. Apparatus as set forth in claim 9 wherein said electrical contacts include:

a pair of electrical contact members for each said contact head, each pair of adjacent contact heads being adapted to contact a common electrical contact member of said pair of electrical contact members.

11. Apparatus as set forth in claim 1 wherein:

each of said guide rollers and swivel rollers include an undercut wedge-shaped portion, said endless belts being wedge-shaped to cooperate with said rollers.

12. Apparatus as set forth in claim 1, wherein:

said guide rollers are coaxial, and said swivel rollers are individually axled, and the axes of said guide rollers and the axes of said swivel rollers are displaced from each other.

13. Apparatus as set forth in claim 1, including:

a drive motor to drive said chassis sections, the guide rollers on one of said chassis sections being drivingly connected with said drive motor; and, a pair of drive belt straps connecting the guide rollers on said one of said chassis sections with the guide rollers on the other of said chassis sections, said guide rollers on said other of said chassis sections being freely movable and driven by the belt strap connections with said guide rollers on said one chassis section.

* * * * *